United States Patent
Devendorf

[11] 4,099,646
[45] Jul. 11, 1978

[54] HOUSING AND COVER RETAINING MEANS

[75] Inventor: Alan E. Devendorf, Phoenix, N.Y.

[73] Assignee: The Magnavox Company, Fort Wayne, Ind.

[21] Appl. No.: 599,286

[22] Filed: Jul. 25, 1975

[51] Int. Cl.² ...................... B65D 45/16; B65D 53/00
[52] U.S. Cl. .................................... 220/324; 220/3.8; 220/344; 220/334
[58] Field of Search ............... 220/324, 334, 337, 344, 220/3.8

[56] References Cited

U.S. PATENT DOCUMENTS

| | | | |
|---|---|---|---|
| 2,803,368 | 8/1957 | Koch | 220/324 X |
| 3,140,344 | 7/1964 | Slater et al. | 220/3.8 X |
| 3,610,460 | 10/1971 | Siklos | 220/344 X |
| 3,716,815 | 2/1973 | Riches | 220/3.8 X |

Primary Examiner—George E. Lowrance
Assistant Examiner—Steven M. Pollard
Attorney, Agent, or Firm—Thomas A. Briody; Frank R. Trifari; William J. Iseman

[57] ABSTRACT

Retaining means that are integrally formed as a part of a housing and its associated cover. Two U-shaped extensions are formed as part of the housing while two oppositely facing tabs are formed on extensions of the cover. The oppositely faced tabs slide into slots formed by the U-shaped extensions. The retaining means can be easily assembled and disassembled without requiring any assembly hardware.

3 Claims, 5 Drawing Figures

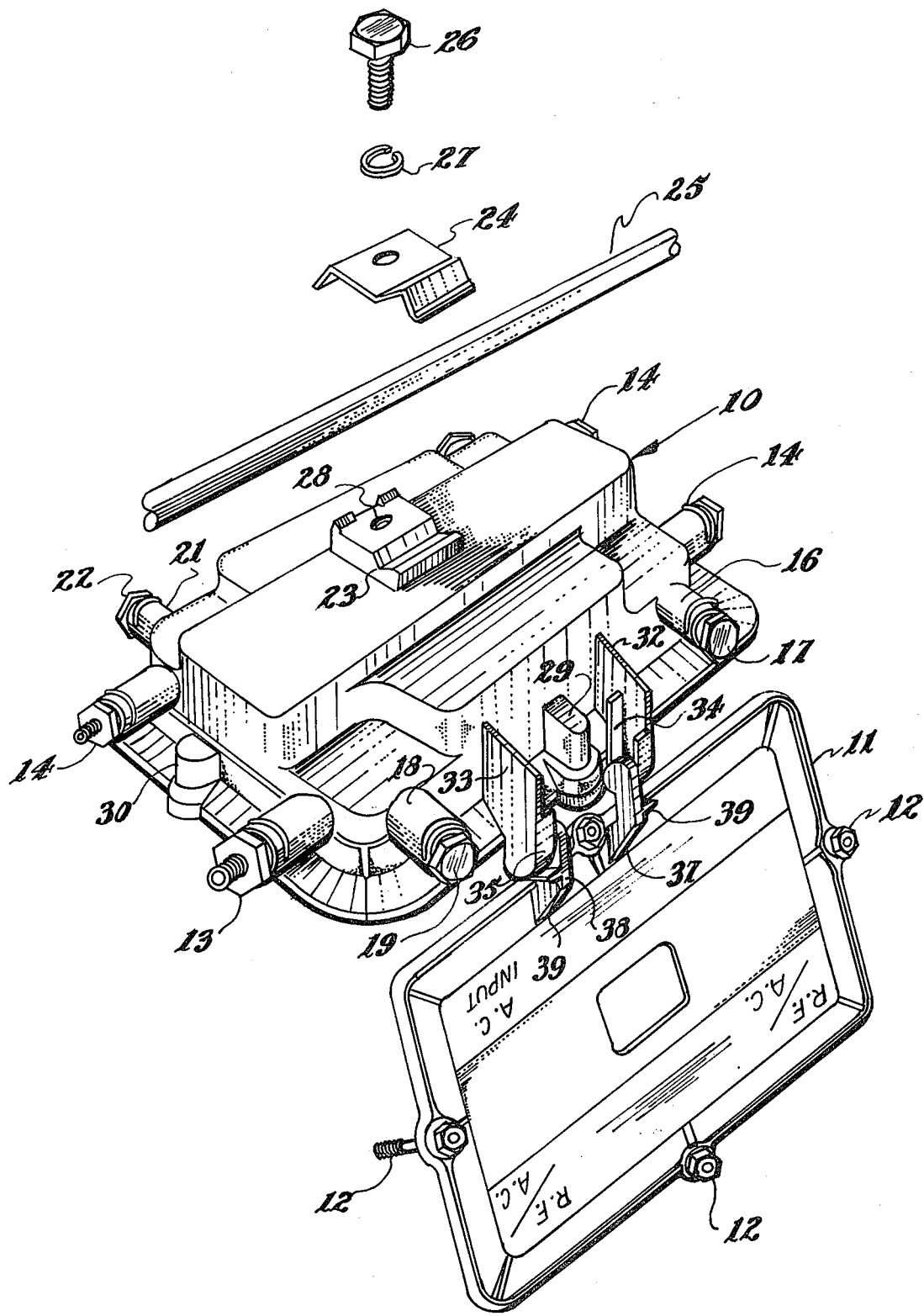

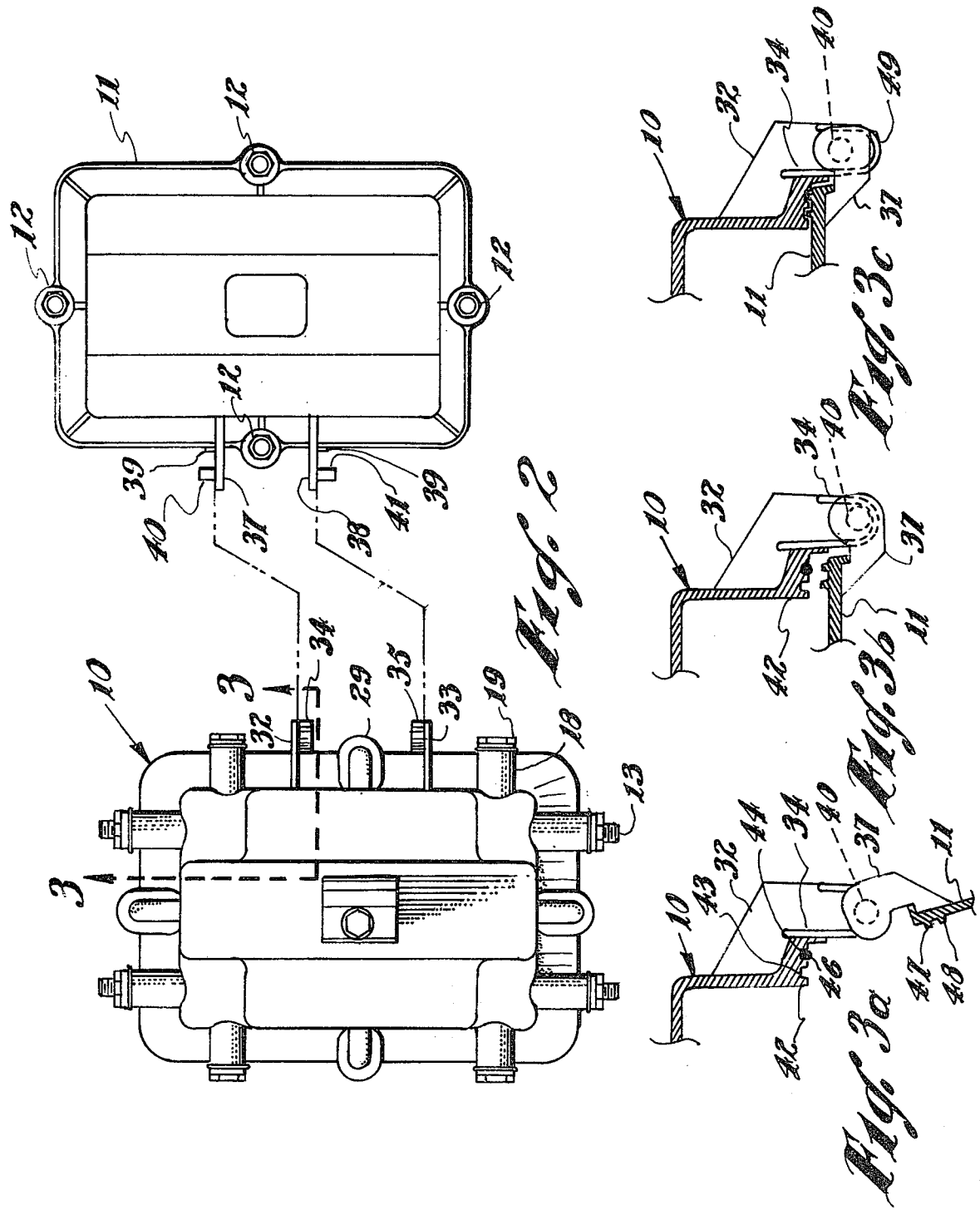

HOUSING AND COVER RETAINING MEANS

BACKGROUND OF THE INVENTION

The present invention relates generally to means for retaining a lid or cover with a housing. More particularly, the present invention relates to means for retaining a cover with a housing or container that does not require any assembly hardware.

Many housings have hinges which are used to guide their associated cover which also serves the purpose of retaining the cover with a housing. However, such hinges usually require assembly hardware in order to fasten the two portions of a hinge together and to attach the hinge to the housing and to the cover. Yet in other applications, particularly CATV distribution systems, housings have been designed without hinges or means for retaining the cover with the housing. In such cases, when the cover is removed from the housing the cover must be held or stored in some location while work is being performed on electronics within the housing itself. If the cover is held, then the repairman is left with only one free hand with which to do the repair.

Enclosures used in CATV distribution systems typically contain electronic circuitry and therefore an access opening must be available to install the circuitry or on occasion to repair or replace the circuitry. In many applications the circuitry is attached directly to a lid or cover for the opening and if the circuitry is of the throw-away type in case of failure, then removal and replacement of the cover is all that is required in order to install new circuitry. Therefore, it would be desirable to have a cover that is easily replaceable and yet can be retained with the housing when access to the interior of the housing is required.

In view of the foregoing, it should now be understood that it would be desirable to provide an improved cover retaining means that would solve the above and other problems.

Accordingly, one of the objects of the present invention is to provide a retaining means to retain a cover with a housing and which does not require assembly hardware and which allows the cover to be removed from the housing without detaching any hardware.

Another object of the invention is to provide a retaining means that can be cast or molded as part of the housing and a cover.

SUMMARY OF THE INVENTION

In carrying out the above and other objects of the invention in one form, I provide an improved retaining means to retain a cover with a housing or container. In one embodiment of the invention a pair of slotted members are located on an outer surface of the housing. The pair of slotted members are open at one end of the slots and the slots are positioned so as to face each other. A pair of projecting tabs facing away from each other are located on the cover. The pair of tabs are located so that they will fit within the slots of the pair of slotted members. The pair of slotted members and pair of projecting tabs cooperate with each other to retain the cover with the housing and to allow the cover to swing into position over the opening in the housing.

The subject matter which I regard as my invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 1 is a view in perspective of a housing incorporating the invention in one form thereof and retaining a cover to the housing;

FIG. 2 is a plan view of the housing and cover with the retaining means being disassembled; and FIGS. 3a, 3b and 3c are views of a partial sectional view through FIG. 2 illustrating the retaining means with the cover in various positions of open to close.

The exemplifications set out herein illustrate the preferred embodiments of the invention in one form thereof, and such exemplifications are not to be construed as limiting in any manner.

DESCRIPTION OF THE PREFERRED EMBODIMENTS

FIG. 1 is a perspective view of the invention in one form. A housing 10 is illustrated with a cover 11 removed from the housing opening and being retained by the retaining means. When the cover 11 is over the opening of the housing 10 the cover is held in position by four screws 12. Housing or container 10 as illustrated is one that would typically be used in a CATV distribution system. In such an application, housing 10 would have an input connection 13 and, as illustrated, three output connectors 14. Of course, it will be understood that housing 10 could have more inputs and outputs depending on the number required for a specific application. Each connector may have an associated port such as 16, 18, or 21. The access ports are commonly provided to allow access to the inside portion of the connector assembly and each access port 16, 18, 21 has a plug 17, 19, 22, respectively.

Housing 10 has a V-shaped groove 23 to accommodate a cable 25. Clamp 24 is then placed over the groove and the cable 25 and is held in place by washer 27 and bolt 26 which is screwed into a threaded hole 28. This arrangement allows housing 10 to be mounted to a cable and suspended in mid air. However, it should be understood that different mounting means than those illustrated could just as well be used. Screw hole enclosures 29 and 30 are shown on housing 10. Each of these screw hole enclosures receives one of the screws 12 that are shown on lid 11.

Two extensions 32 and 33 are positioned on the outer surface of housing 10. Each extension 32, 33 has a U-shaped slotted member 34, 35, respectively. Slotted members 34 and 35 are positioned on the extensions 32 and 33 so that the slotted members face each other and have an open end facing upward. The lid or cover 11 also has two projections 37 and 38 extending from its outer surface and located in a position so that the extensions 37 and 38 will fit between extensions 32 and 33 of housing 10. Each extension 37, 38 has a blade 39 protruding from it. Blades 39 are provided to eliminate the possibility of the lid being locked into the opening of housing 10 when the lid 11 is covering the opening. When the lid is opened, blades 39 will ride against the bottom portion of slotted members 34, 35 tending to keep the lid centered so that it will not bind or lock against the rim of the opening.

Extensions 32, 33 and U-shaped members 34, 35 are all formed integrally with housing 10. Typically, housing 10 would be die cast if it were made of metal or molded if it was made of a plastic material. Projections 32, 33 and U-shaped members 34, 35 are virtually costless since there is no expense of assembling these components to housing 10 nor is additional hardware used to attach them to housing 10.

In FIG. 2 tabs 40 and 41 can be seen extending from projections 37 and 38 respectively. Tabs 40 and 41 slide into the open end of the slots provided by U-shaped members 34 and 35 respectively. It should by now be apparent the ease with which the cover 11 is engaged to the retaining means portion on housing 10. When it is desired to remove cover 10 from housing 11 all that has to be done is to open the cover, swing it back and lift it up so that tabs 40, 41 slide out through the top of the slots formed by U-shaped members 34 and 35. Tabs 40 and 41 are cast or molded along with extensions 37, 38 and blades 39 when the cover 11 is cast or molded. Accordingly there is no labor or assembling hardware involved in attaching these components to the cover.

FIGS. 3a, 3b, and 3c are sectional views taken through the lines 3—3 of FIG. 2. In FIG. 3a tab 40 is shown engaged in the slots formed by U-shaped member 34. Cover 11 is shown in an open position. Opening 42 of housing 10 is shown having a groove 43 and a groove 44. These grooves completely surround the periphery of opening 42. Groove 44 contains a gasket 46. The use of a gasket in groove 44 is optional and in some environments it may not be necessary. Cover 11 has a ridge 47 which meets with gasket 46, when cover 11 is over opening 42, to insure proper sealing of opening 42. In addition, ridge 48 on lid 11 extends into groove 43 to provide a barrier to prevent any radio frequency interference from entering housing 10 through opening 42 when the opening is closed by cover 11. The ridges 47 and 48 cooperate with grooves 43 and 44 to provide a high impedance path for any electromagnetic or radio frequency interference waves that would try to enter housing 10 through the junction formed by cover 11 and housing 10.

FIG. 3b illustrates the position of cover 11 before it is fully closed. The spacing between lid 11 and the periphery of opening 42 could accommodate a large gasket if such were desired or required. This is an additional advantage that is provided by this retaining means. In cases where prior art hinges are provided to retain a cover to a housing additional adjusting means must also be incorporated into the hinge design to compensate for thick gaskets, otherwise, the prior art hinge will not accommodate a thick gasket. On the other hand, if a hinge is designed to accommodate a thick gasket the opening will not be fully sealed or closed when a smaller gasket is used.

FIG. 3c shows lid 11 completely closing opening 42. This view better illustrates how bight portion 49 of U-shaped member 34 extends below the lower surface of housing 10. It is this extension of bight portion 49 which allows tab 40 to slide down and thereby accommodate a thick gasket. It should also be noted that one leg of U-shaped portion 34 extends further than the other leg. This facilitates inserting tab 40 into the slot. This might be easier understood by visualizing lid 11 being moved toward the slots of housing 10 in FIG. 2, then in FIG. 3a it will be noted that the longer leg of U-shaped member 34 will stop tab 40 and permit tab 40 to slide down into the slot formed by U-shaped member 34.

It will now be appreciated that I have provided an improved retaining means to retain a cover to a housing assembly. And although the foregoing description has been more particularly related to retain a cover to a CATV distribution housing, it will be appreciated that my retaining means could be used on containers used in different applications even including plastic containers. In addition, if the container were intended to be normally positioned so the opening would be facing up then the U-shaped members could be rotated so that the opened slots would be facing in a downward direction thereby allowing the tabs located on the cover to slide down into the bottom portion of the U-shaped members and be retained therein when the cover is in an open position. My invention has provided an extremely low cost cover retaining means that is free of assembly labor or of the cost of additional attaching hardware. In addition, the retaining means allows for the use of thick gaskets surrounding an opening. Furthermore, those skilled in the art will appreciate that by having the U-shaped members extending below the housing that any moisture running off the side of the housing will tend to drip off the housing from the U-shaped members instead of trying to collect around the junction formed by the cover and the opening of the housing and seeping or wicking into the interior of the housing.

Consequently, while in accordance with the Patent Statutes, I have described what at present are considered to be the preferred forms of my invention, it will be obvious to those skilled in the art that numerous changes and modifications may be made herein without departing from the true spirit and scope of the invention, and it is therefore aimed in the following claims to cover all such modifications.

What I claim as new and desire to secure by Letters Patent of the United States is:

1. A CATV distribution housing having a cover and a cover retainer, the cover retainer comprising: a pair of slotted members located on an outer surface of the housing; the pair of slotted members having slots that are open at one end thereof, the slots being positioned to face each other; and a pair of projecting tabs facing away from each other and positioned on the cover, the pair of tabs being located to mate within the slots of the pair of slotted members, the pair of slotted members and the pair of projecting tabs cooperating to retain the cover with the housing wherein the pair of slotted members extend beyond a surface of the housing containing the opening, the extensions of the pair of slotted members being provided to accommodate thick gaskets located around the surface of the opening and to allow the cover to swing into position over an opening in the housing.

2. A housing having an opening, a cover and a retainer to hold the cover to the housing, comprising: at least two U-shaped extensions formed as an integral portion of the housing; the at least two U-shaped extensions being located on an outer surface of the housing near the periphery of the opening; and at least two projecting tabs located on the outer surface of the cover, the projecting tabs being positioned to mate with the U-shaped extensions, the U-shaped extensions providing a slideway for the projecting tabs to allow easy assembly and disassembly of the housing and cover, the U-shaped extensions and the projecting tabs cooperating to retain the cover with the housing when the opening is open and to guide the cover when the cover is being placed over the opening.

3. A horizontally mounted CATV cable distribution housing having an opening facing downward on the bottomside of the housing and a cover to completely cover the opening and a retainer, comprising: at least two slots around the periphery of the opening, one slot to retain a gasket and another slot to provide a discontinuous path for radio frequency signals; at least two U-shaped extensions located on a side of the housing with bight portions of the at least two U-shaped extensions extending below the bottomside of the housing; and at least two extending members located on an edge of the outer surface of the cover, each of the at least two extending members having a tab projecting therefrom and at substantially right angles thereto, the projecting tabs facing away from each other and positioned to slide into openings in the U-shaped extensions at ends of the legs of the U-shaped extensions, the projecting tabs cooperate with the U-shaped extensions to retain the cover with the housing when the cover is not covering the opening in the housing, the bight portion of the U-shaped extensions extending below the bottomside of the housing to allow a thick gasket to be placed in at least one of the slots around the periphery of the opening and to allow any moisture that may flow down the U-shaped extensions to drip off the bight portion.

* * * * *